(12) United States Patent
Ni et al.

(10) Patent No.: US 8,151,758 B2
(45) Date of Patent: Apr. 10, 2012

(54) BEARING SYSTEM FOR AUTOMOTIVE ENGINE

(75) Inventors: Ben Xuehai Ni, Canton, MI (US); John Matthew Pieprzak, Novi, MI (US); Calvin Lee Brower, Plymouth, MI (US)

(73) Assignee: Ford Global Technologies, Dearborn, MI (US)

( * ) Notice: Subject to any disclaimer, the term of this patent is extended or adjusted under 35 U.S.C. 154(b) by 764 days.

(21) Appl. No.: 12/350,315

(22) Filed: Jan. 8, 2009

(65) Prior Publication Data

US 2010/0170468 A1    Jul. 8, 2010

(51) Int. Cl.
*F01M 1/02* (2006.01)
*F16C 33/10* (2006.01)

(52) U.S. Cl. ............... 123/196 R; 184/6.5; 384/288

(58) Field of Classification Search ............ 123/195 R, 123/196 R; 184/6.5, 6.8; 384/288, 291
See application file for complete search history.

(56) References Cited

U.S. PATENT DOCUMENTS

| 3,017,229 A | 1/1962 | Dilworth |
| 4,302,060 A | 11/1981 | Nicholas et al. |
| 4,567,815 A | 2/1986 | Kocher |
| 5,009,522 A | 4/1991 | Hahn |

*Primary Examiner* — Noah Kamen
(74) *Attorney, Agent, or Firm* — Jerome R. Drouillard; James Dottavio

(57) ABSTRACT

The bearing system for an automotive engine includes a first bearing support structure formed in a cylinder block bulkhead and having a first bearing insert. A second bearing support structure is removably mounted to the first bearing support structure and contains a second bearing insert. A lubrication channel formed in an inside diameter of the first bearing insert and an inside diameter of the second bearing insert extends along a portion of the first bearing insert from a smaller bearing clearance position offset from a first bearing parting line and into a smaller bearing clearance portion of the second bearing insert extending past a second bearing parting line. The lubrication channel provides an improved flow of oil to a drilled passage formed in a shaft, such as a crankshaft, to feed oil to various bearings, such as connecting rod bearings, while reducing oil leakage from such a bearing system.

15 Claims, 2 Drawing Sheets

BEARING SYSTEM FOR AUTOMOTIVE ENGINE

BACKGROUND OF THE INVENTION

1. Field of the Invention

The present invention relates to bearings for use in automotive engines, and particularly to main bearings supporting the crankshaft of a reciprocating internal combustion engine.

2. Related Art

Many machines, particularly internal combustion engines, utilize plain bearings for mounting rotating shafts such as a crankshaft of a reciprocating engine. Crankshafts present a special need because lubrication is required not only for the crankshaft's main bearings, but also for the bearing journals upon which connecting rods ride. In order to permit lubrication of connecting rod journals, most engines use the prior art oil transfer scheme illustrated in FIG. 3. As shown in FIG. 3, crankshaft 102 is mounted between a lower insert, 110, and an upper insert, 106. An oil groove, 114, is included to supply oil to a drilling in the crankshaft. The drilling allows oil to be picked up and sent to the crankshaft's connecting rod journals. The length of the oil groove must be sufficient to furnish a required quantity of ail to one or more connecting rod journals. With the arrangement shown in FIG. 3, oil groove 114 terminates at both ends within the parting line regions between lower insert 110 and upper insert 106. Because these regions have the greatest bearing clearance, more oil is allowed to leak through this region, and the oil pressure within not only groove 114, but also the remaining portions of the engine, is reduced. As a result, less oil is caused to enter the drilling of crankshaft 102. It would be desirable to provide a main bearing construction in which less of the oil is allowed to leak past the crankshaft main bearing journal, while maintaining, or even increasing, the length of the bearing's oil groove, thereby boosting the oil pressure within groove 114 while making more oil available to the connecting rod bearings, or enabling the usage of a smaller oil pump.

SUMMARY OF THE INVENTION

According to an aspect of the present invention, a bearing system for an automotive engine includes a first bearing support structure formed in a cylinder block bulkhead. A first bearing insert is mounted to the first bearing support structure. A second bearing support structure is mounted to the first bearing support structure in a removable fashion. A second bearing insert is mounted to the second bearing support structure such that the first bearing insert and the second bearing insert abut at first and second parting lines. The first bearing support structure and the second bearing support structure also define a foundation parting line which is co-linear with the first and second parting lines defined by the bearing inserts.

A lubrication channel is formed on an inside diameter of the first bearing insert and an inside diameter of the second bearing insert. The lubrication channel extends along a portion of the first bearing insert from a position offset from the first parting line in the normal direction of rotation of the crankshaft and into a portion of the second bearing insert extending past the second parting line.

According to another aspect of the present invention, a lubricant supply pocket is formed in the first bearing support structure at a location underlying a portion of the first bearing insert. The lubricant supply pocket is in fluid communication with a number of oil holes extending through the first bearing insert and into the lubrication channel. The lubricant supply pocket is provided with lubricating oil under pressure from a passage formed within a cylinder block bulkhead.

According to another aspect of the present invention, the lubrication channel is offset in the direction of rotation of a shaft, such as a crankshaft, rotatably supported by the bearing system. This offset may be approximately 15 to 30 degrees of rotation.

According to another aspect of the present invention, a lubrication channel formed in the bearing inserts includes a central portion having a generally invariant depth and two end portions in which the depth of the channel decreases from the generally invariant depth to a null value.

It is an advantage of a bearing system according to the present invention that an engine oil pump may be downsized because less oil is permitted to leak past the bearing inserts servicing the crankshaft's main bearing journals. Alternatively, more oil may be furnished to the connecting rod journals without upsizing the engine's oil pump.

It is another advantage of a bearing system according to the present invention that the system may be provided with conventional main bearing bulkheads and main bearing caps, without the need for expensive modifications.

It is another advantage of a bearing system according to the present invention that an oil groove extends in the upper and lower bearing inserts from a first low-bearing clearance position within a first bearing insert to a second low-bearing clearance position within a second bearing insert, reducing oil leakage without sacrificing oil delivery to the connecting rod bearings.

Other advantages, as well as features of the present invention, will become apparent to the reader of this specification.

DETAILED DESCRIPTION OF THE PREFERRED EMBODIMENTS

Figure 1:
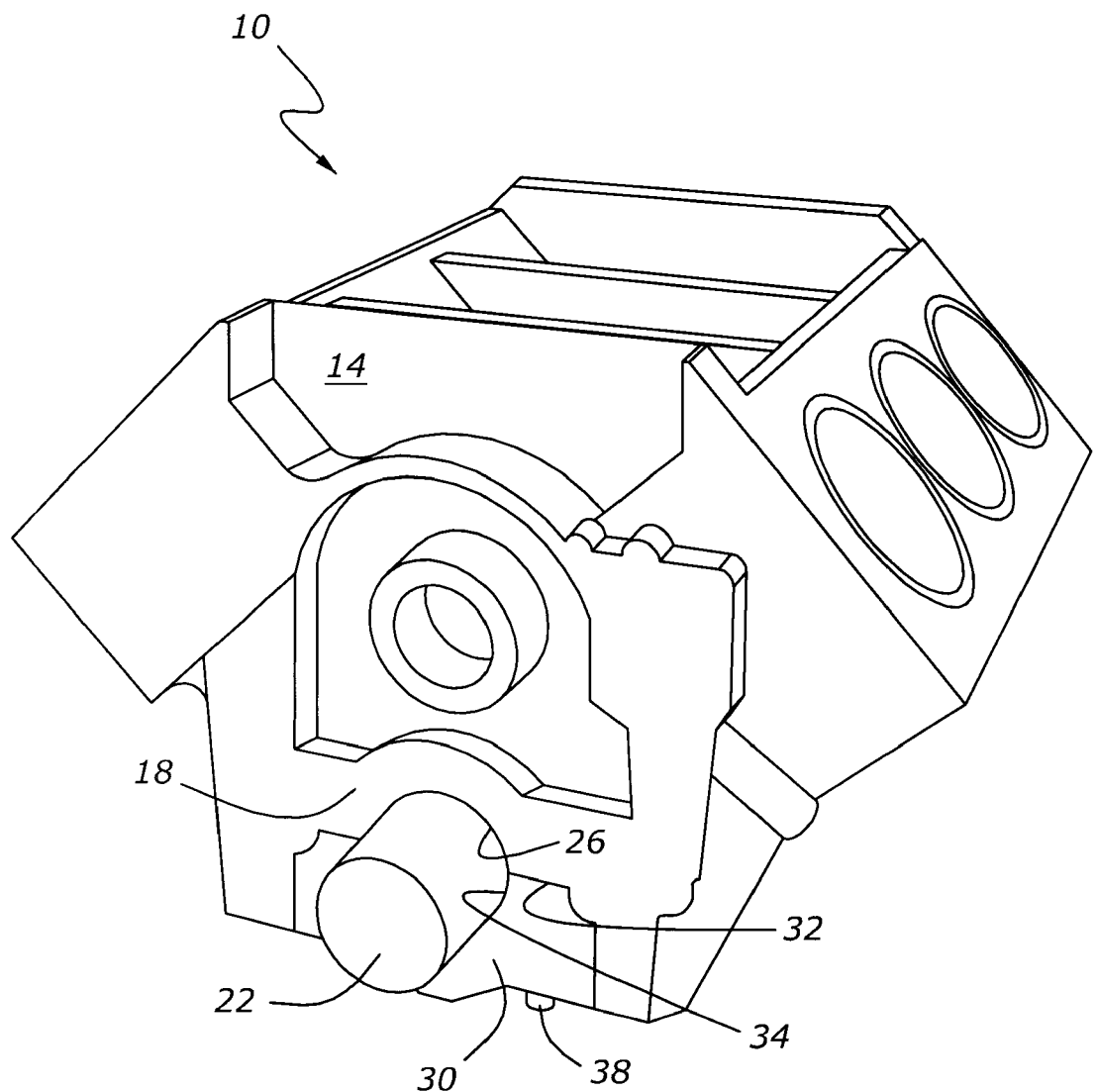
FIG. 1 is a partially schematic perspective view of an engine having a bearing system according to the present invention.

As shown in FIG. 1, engine 10 has a cylinder block, 14, with a number of main bearing bulkheads, 18. One main bearing bulkhead 18 is shown, it being understood that other bulkheads are located along the length of cylinder block 14 in conventional fashion. A crankshaft, 22, having an oil hole drilling, 46, is mounted within engine 10 using the inventive bearing system.

The present bearing system includes a first bearing support structure, 26, which is incorporated in main bearing bulkhead 18. A second bearing support structure, 34, is located in a main bearing cap, 30, which is removably attached to main bearing bulkhead 18 and first bearing support structure 26 by a number of cap screws, 38. Taken together, first bearing support structure 26 and second bearing support structure 34 provide a circular bore into which a first bearing insert, 50, and second bearing insert, 54, can be placed, achieving the spatial relationship shown in FIG. 2.

Figure 2:
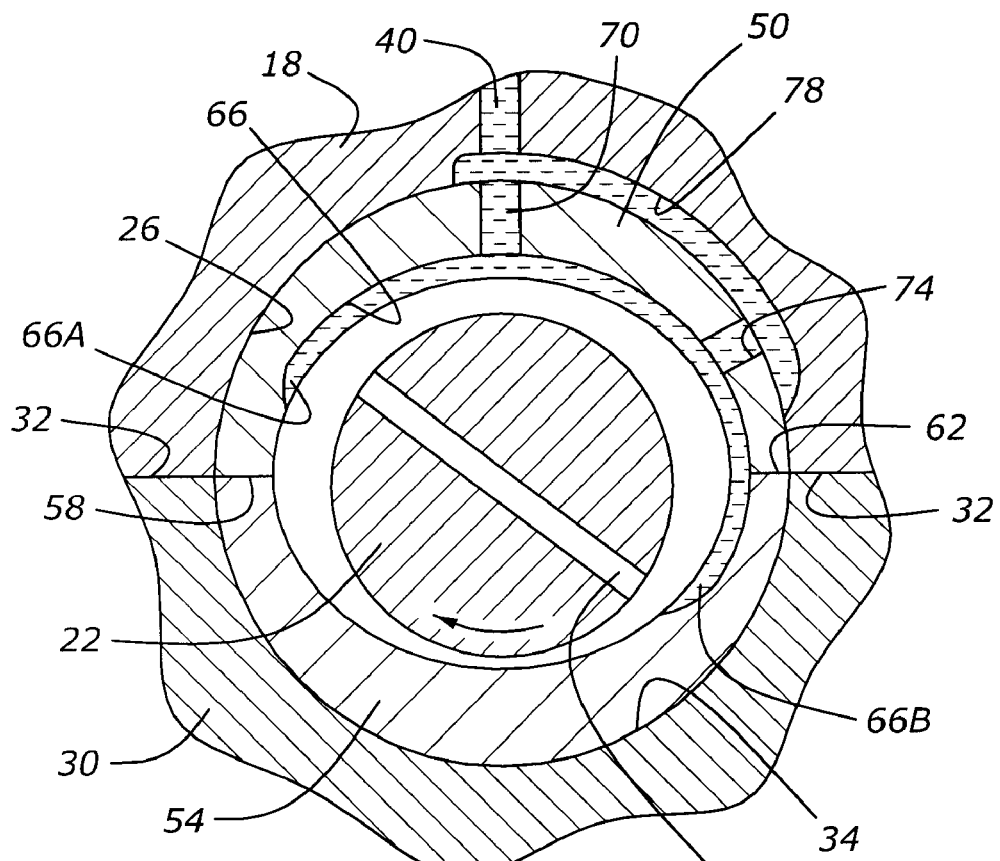
FIG. 2 is a sectional view of a portion of a bearing system according to the present invention.

FIG. 2 shows a first parting line, 58, and second parting line, 62, which correspond with foundation parting line 32 between main bearing bulkhead 18 and main bearing cap 30 (FIG. 1). FIG. 2 shows, in an exaggerated form, the bearing clearances about crankshaft 22. Thus, the clearances are shown as being the greatest at first parting line 58 and second parting line 62. Lubrication channel 66 is formed within the inside diameters of bearing inserts 50 and 54. Lubrication channel 66 is offset by 15 to 30 degrees of rotation in the direction of rotation of crankshaft 22 from first parting line 58. Notice from FIG. 2 that lubrication channel 66 has a central portion with a generally invariant depth and two end portions, 66A and 66B. Given the illustrated clockwise rotation of crankshaft 22, 66A is a starting region of lubrication channel 66.

Those skilled in the art will appreciate in view of this disclosure that offsetting lubrication channel or groove 66 in the direction of rotation of crankshaft 22 facilitates maintaining oil pressure within groove 66 due to the natural pumping action produced by the rotating journal. Also, the high film pressure developed by the converging clearance in second bearing insert 54 limits oil leakage from the main bearing system.

Figure 3:
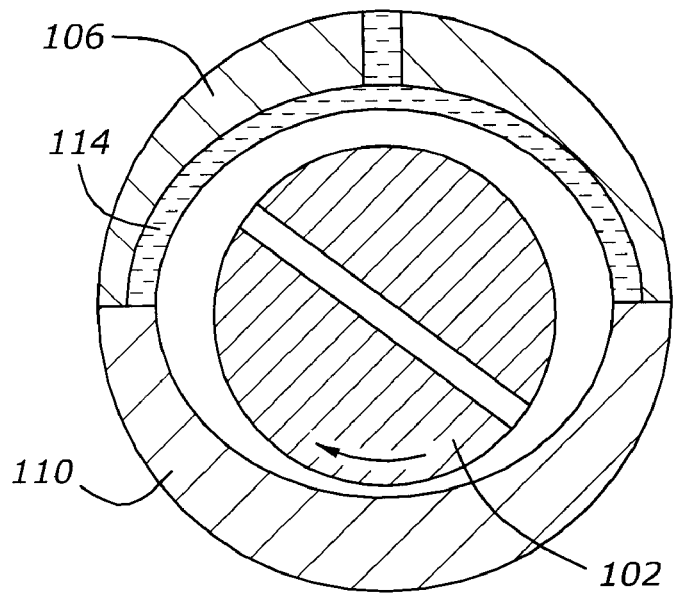
FIG. 3 is a sectional view of a prior art bearing system.

At section 66A as well as at section 66B, the depth of the lubrication channel 66 goes from its full depth to a null value, in other words, the channel ends. Because lubrication channel 66 begins after the region about first parting line 58 at which the bearing clearance is a maximum value, the oil pressure loss caused by oil flowing out of the channel into the clearance area is reduced. This reduction of oil flow is true even though channel 66 extends past the second parting line, 62, because groove 66 extends into an area of lesser bearing clearance and concomitantly lesser oil leakage. The extension of groove 66 past second parting line 62 and well into second insert 54 enable groove 66 to exceed the length of the conventional groove shown in FIG. 3.

FIG. 2 also shows a lubricant supply pocket, 78, which is formed in bulkhead 18, and which is in fluid communication with oil holes 70 and 74 formed in first bearing insert 50. Multiple oil holes 70 and 74 allow an ample supply of pressurized oil from oil passage 40, which is formed in cylinder block bulkhead 18, to be passed through pocket 78 to oil holes 70 and 74.

Those skilled in the art will appreciate in view of this disclosure that lubrication channel 66 may extend to a greater or lesser extent past second parting line 62. The present inventors have determined that it may be desirable for lubrication channel 66 to extend past second parting line 62 by as much as 45 degrees or more. This will allow lubrication channel 66 to extend for a length corresponding to more than one-half of the total inside circumference of first bearing insert 50 and said second bearing insert 54, while having the effect of making more oil available to the connecting rod journals.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. A bearing system for an automotive engine, comprising:
   a first bearing support structure formed in a cylinder block bulkhead;
   a first bearing insert mounted to said first bearing support structure;
   a second bearing support structure mounted to said first bearing support structure;
   a second bearing insert mounted to said second bearing support structure such that said first bearing insert and said second bearing insert abut at first and second parting lines; and
   a lubrication channel formed in an inside diameter of said first bearing insert and in an inside diameter of said second bearing insert, with said lubrication channel extending along a portion of said first bearing insert starting from a position offset from said first parting line and ending at a portion of said second bearing insert extending past said second parting line.

2. A bearing system according to claim 1, wherein said second bearing support structure is removably mounted to said first bearing support structure.

3. A bearing system according to claim 1, further comprising a lubricant supply pocket formed in said first bearing support structure at a location underlying a portion of said first bearing insert, wherein said lubricant supply pocket is in fluid communication with a plurality of oil holes extending through said first bearing insert and into said lubrication channel.

4. A bearing system according to claim 3, wherein said lubricant supply pocket is provided with lubricating oil under pressure from a passage formed within the cylinder block bulkhead.

5. A bearing system according to claim 1, wherein the beginning of said lubrication channel is offset away from the first parting line in the direction of rotation of a shaft rotatably supported by said bearing system.

6. A bearing system according to claim 1, wherein the beginning of said lubrication channel is offset by 15 to 30 degrees of rotation in the direction of rotation of a shaft supported by said bearing system.

7. A bearing system according to claim 1, wherein said lubrication channel comprises a central portion having a generally invariant depth, and two end portions in which the depth of the channel decreases from said generally invariant depth to a null value.

8. A bearing system according to claim 1, wherein said lubrication channel extends for a length corresponding to more than one-half of the total inside circumference of said first bearing insert and said second bearing insert.

9. A bearing system for an automotive engine, comprising:
   a first generally semicircular bearing support structure formed in a cylinder block bulkhead;
   a first bearing insert mounted to said first bearing support structure;
   a second generally semicircular bearing support structure mounted to said first bearing support structure;
   a second bearing insert mounted to said second bearing support structure such that said first bearing insert and said second bearing insert abut at first and second parting lines;
   a lubrication channel formed at a common inside diameter of said first bearing insert and said second bearing insert, with said lubrication channel extending along a portion of said first bearing insert starting from a position offset from said first parting line and ending at a portion of said second bearing insert extending past said second parting line; and
   a lubricant supply pocket formed in said first bearing support structure at a location underlying a portion of said first bearing insert, wherein said lubricant supply pocket is in fluid communication with a source of lubricant under pressure, as well as with a plurality of oil holes extending through said first bearing insert and into said lubrication channel.

10. A bearing system according to claim 9, wherein said lubrication channel comprises a central portion having a generally constant depth, and two end portions in which the depth of the channel decreases from said generally constant depth to a null value.

11. A bearing system according to claim 9, wherein said first bearing insert and said second bearing insert each span about one-half of the inner circumference of a circular support structure defined by the first bearing support structure and the second bearing support structure.

12. A bearing system according to claim 9, wherein said lubricant supply pocket extends for a span which is less than the span of said lubrication channel.

13. A main bearing system for an automotive engine, comprising:
- a first generally semicircular bearing support structure formed in a cylinder block bulkhead;
- a first bearing insert mounted to said first bearing support structure;
- a second generally semicircular bearing support structure mounted to said first bearing support structure;
- a second bearing insert mounted to said second bearing support structure such that said first bearing insert and said second bearing insert abut at first and second parting lines;
- a lubrication channel formed at a common inside diameter of said first bearing insert and said second bearing insert, with said lubrication channel extending along a portion of said first bearing insert starting from a position offset from said first parting line and ending at a portion of said second bearing insert extending past said second parting line;
- a lubricant supply pocket formed in said first bearing support structure at a location underlying a portion of said first bearing insert, wherein said lubricant supply pocket is in fluid communication with a source of lubricant under pressure, as well as with a plurality of oil holes extending through said first bearing insert and into said lubrication channel; and
- a crankshaft rotatably supported by said first bearing support structure and said second bearing support structure, as well as said first bearing insert and said second bearing insert.

14. A main bearing system according to claim 13, wherein said lubrication channel is offset by 15 to 30 degrees of rotation in the direction of rotation of said crankshaft.

15. A main bearing system according to claim 13, wherein said lubrication channel extends into said second bearing insert for about 45 degrees of rotation past said second parting line.

* * * * *